United States Patent Office 2,832,777
Patented Apr. 29, 1958

2,832,777

2-AMINOPHENYL-3-METHYLMORPHOLINES

Max J. Kalm, Skokie, Ill., assignor to G. D. Searle & Co., Chicago, Ill., a corporation of Delaware No Drawing. Application November 26, 1956
Serial No. 624,214

4 Claims. (Cl. 260—247.5)

This invention relates to optionally N-alkylated 2-aminophenyl-3-methylmorpholines. More particularly, this invention relates to compounds of the formula

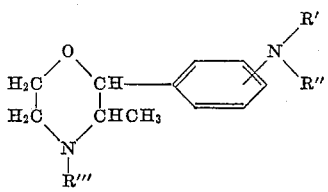

wherein R' and R" each designate, variously or alike, hydrogen or a lower alkyl, hydroxy(lower alkyl), cycloalkyl, or lower alkenyl radical; and R''' refers to hydrogen or a lower alkyl radical.

Among the lower alkyl radicals comprehended by R', R", R''' in the above formula are methyl, ethyl, propyl, isopropyl, butyl, isobutyl, sec-butyl, tert-butyl, pentyl, isopentyl, tert-pentyl, neopentyl, hexyl, isohexyl, heptyl, and like $C_sH_{2s+1}$ radicals wherein $s$ is a positive integer amounting to less than 9. The hydroxy(lower alkyl) radicals represented are, for example, 2-hydroxyethyl, 2-hydroxypropyl, 1-(hydroxymethyl)propyl, 1,1-di(hydroxymethyl)propyl, 3-hydroxypropyl, 3-hydroxybutyl, 5-hydroxypentyl, and such other radicals as may be considered to consist of lower alkyl groupings in which one or more hydrogens are replaced by a corresponding number of hydroxyl radicals. The cycloalkyl substituents contemplated in the formula for compounds of this invention are preferably those incorporating fewer than 7 carbon atoms, more especially the cyclopentyl and cyclohexyl groupings. As to the lower alkenyl radicals prescribed, these include vinyl, allyl, 2-butenyl, 2-methylallyl, and like univalent radicals derived by the elimination of a single hydrogen atom from acyclic hydrocarbons containing a double bond.

Compounds of the type set forth are most advantageously adapted to the objectives of this invention when the amino radical present in the benzene ring is positioned para to the point of attachment of said ring to the morpholine nucleus. However, it will be obvious to those skilled in the art that ortho and meta aminophenyl substituents likewise represent valuable embodiments of the subject invention.

The compounds now disclosed are useful because of their potent physiological activity. For example, they are anorectic agents, being capable of a substantial and sustained inhibition of the appetite. Additionally, the claimed compounds have anti-emetic properties: they operate through the central nervous system to control apomorphine-induced nausea and vamiting.

Equivalent to the hereinabove described basic amines for the purposes of this invention are those non-toxic acid addition salts corresponding thereto having the formula

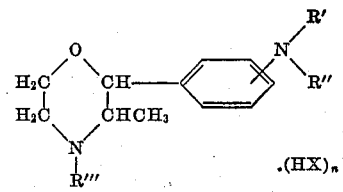

wherein R', R", and R''' are defined as before; X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $n$ is an integer amounting to less than 3.

The compounds to which this invention relates can be prepared by a number of different methods, among which are the following: 2-(p-aminophenyl)-3-methylmorpholine, in many respects an archetype of the compositions represented, derives from 3-methyl-2-phenylmorpholine upon nitration with, for example, sulfuric acid and potassium nitrate, followed by hydrogenation in the presence of platinum catalyst. Corresponding lower alkyl, hydroxy(lower alkyl), cycloalkyl, and lower alkenyl compounds, in turn, are produced by treatment of 2-(p-aminophenyl)-3-methylmorpholine with an appropriate halide—especially, a chloride—such as 1-chlorooctane, 3-chloro-1,2-propanediol, chlorocyclopentane, chlorocyclohexane, 3-chloropropane, etc. Alternatively, the N-methyl derivatives of this invention are preparable via the Eschweiler-Clarke modification of the Leuckart reaction; and the 2-hydroxyethylamino compounds can be obtained through the agency of ethylene oxide, as hereinafter elaborated. Where it is desired to synthesize a claimed secondary or tertiary phenylamine in which the morpholino nitrogen is unsubstituted, the latter is acylated—for example, with benzoyl chloride—prior to modification of the p-aminophenyl radical, the blocking group being subsequently removed by hydrolysis. Through appropriate variation of the foregoing procedures, "mixed" tertiary amines such as those of Example 4 herein are composed.

The following examples describe in detail certain of the aminomorpholines illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury and relative amounts of materials in parts by weight, except as otherwise noted. The symbol "N" as used herein stands for "normal," a term designating concentration in equivalent weights of solute per unit volume of solution.

*Example 1*

A. *3-methyl-2-(p-nitrophenyl)morpholine.*—To 26 parts of 3-methyl-2-phenylmorpholine is added, with agitation, 430 parts of concentrated sulfuric acid, the substantial heat effect thereby produced being controlled by means of external cooling. To the resultant mixture is added, portionwise with continued agitation at 0–5° C. 15 parts of potassium nitrate. Agitation is continued while the mixture warms to room temperature and for 2½ hours longer, whereupon the mixture is cautiously dumped onto approximately 1900 parts of ice. The solution which results is neutralized with soda ash and then extracted with ether. The ether extract, dried over anhydrous sodium sulfate, is stripped of solvent by distillation. There remains as a residue 3-methyl-2-(p-nitrophenyl)morpholine.

B. *2-(p-aminophenyl)-3-methylmorpholine.*—The product of the foregoing part A of this example is taken up in approximately 240 parts of anhydrous ethanol, and to this solution is added 1 part of platinum oxide and 35 parts of 2-propanol containing approximately 11 parts of hydrogen chloride. Low pressure hydrogenation of the resultant mixture is carried to the point of theoretical gas uptake for conversion of nitro to amino grouping, whereupon catalyst is removed by filtration and solvent stripped by distillation. The residue is dissolved in approximately 100 parts of water, and this solution is made alkaline with caustic soda, then extracted with ether. Solvent is again evaporated, whereupon the residue is then distilled to give 2-(p-aminophenyl)-3-methylmorpholine as a viscous oil boiling at 159–162° C. under 4 mm. pressure. The product has the formula

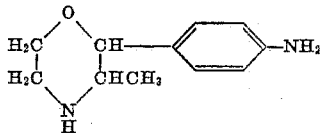

Treatment of an alcoholic solution of the tertiary base with two equivalents of hydrogen bromide dissolved in absolute ethanol affords the dihydrobromide, which is caused to crystallize by addition of ether. The dibromide melts at 259° C. (dec.). Substitution of hydrogen chloride for hydrogen bromide in the salt-forming operation affords the dihydrochloride, which crystallizes from the reaction mixture without the necessity of ether being added to reduce solubility. The dihydrochloride melts at 227–229° C. (dec.).

*Example 2*

*3,4-dimethyl-2-(p-dimethylaminophenyl)morpholine.*— To approximately 15 parts of 2-(p-aminophenyl)-3-methylmorpholine is added 30 parts of 90% formic acid and 22 parts of 36% formaldehyde. The resultant mixture is heated at the boiling point under reflux for 8 hours, whereupon it is made alkaline with aqueous caustic soda. Ether extraction of the mixture thus obtained affords, on removal of solvent by distillation of the extract, 3,4-dimethyl-2-(p-dimethyl-aminophenyl)morpholine as a viscous oily residue, the infrared spectrum of which shows a corroborating absence of the N—H absorption band at 2.9 microns. The product has the formula

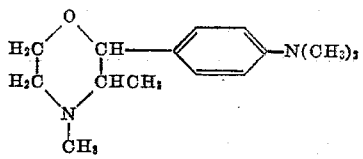

*Example 3*

A. *4-benzoyl-3-methyl-2-(p-nitrophenyl)morpholine.*— To 46 parts of 3-methyl-2-(p-nitrophenyl)morpholine is added 11 parts of caustic soda dissolved in 85 parts of water. There is then introduced, at 35–40° C. and with agitation, 30 parts of benzoyl chloride, this operation being carried out at a rate compatible with maintenance of the indicated reaction temperatures during external cooling. Agitation is continued until all exothermic effects subside, whereupon the mixture is cooled to around 10° C. and the aqueous phase therein decanted from the solids present. The solids are washed with aqueous 10% muriatic acid to remove un-benzoylated starting material, if any, and then washed with water. Recrystallization of the resultant solids from ethanol affords 4-benzoyl-3-methyl-2-(p-nitrophenyl)morpholine melting in the range 139–143° C.

B. *2-(p-aminophenyl)-4-benzoyl-3-methylmorpholine.*— To a solution of 17 parts of 4-benzoyl-3-methyl-2-(p-nitrophenyl)-morpholine in 120 parts of anhydrous ethanol is added 12 parts of 2-propanol containing 4 parts of hydrogen chloride. Approximately 1 part of platinum oxide catalyst is then introduced, whereupon the mixture is subjected to low pressure hydrogenation. When uptake of hydrogen confirms conversion of the nitro group present to an amino radical, catalyst is removed by filtration, solvent is removed from the filtrate by distillation, and the residue is taken up in 100 parts of water. Upon precipitation by neutralization with dilute caustic soda, the product is extracted with a mixture of ether and benzene. Solvent is again removed by distillation, leaving as a residue the desired 2-(p-aminophenyl)-4-benzoyl-3-methylmorpholine.

C. *4-benzoyl-2-(p-cyclohexylaminophenyl)-3-methylmorpholine.*—To 15 parts of 2-(p-aminophenyl)-4-benzoyl-3-methylmorpholine dissolved in 200 parts of butanone is added 6 parts of chlorocyclohexane, 8 parts of potassium iodide, and 7 parts of potassium carbonate. The resultant mixture is heated at the boiling point under reflux for 3 hours, then filtered to remove inorganic solids precipitated in process. The filtrate is stripped of solvent by distillation in vacuo, whereupon the residue is diluted with water and the resultant mixture extracted with a mixture of ether and benzene. Upon evaporation of solvent from the extract, 4-benzoyl-2-(p-cyclohexylaminophenyl)-3-methylmorpholine is obtained as the residue.

D. *2 - (p - cyclohexylaminophenyl) - 3 - methylmorpholine.*—A mixture of 15 parts of 4-benzoyl-2-(p-cyclohexylaminophenyl)-3-methylmorpholine, 80 parts of ethanol, and approximately 130 parts of aqueous 20% muriatic acid is heated at the boiling point under reflux for 3 hours. Ethanol is then distilled off under reduced pressures, following which the residue is extracted with ether, to remove benzoic acid. The aqueous phase is made alkaline with dilute caustic soda, and the mixture which results at this point is extracted with ether. Upon removal of solvent from the extract by distillation, there remains as a residue 2-(p-cyclohexylaminophenyl)-3-methylmorpholine, the formula which is

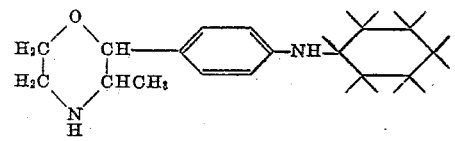

*Example 4*

*2 - (p - N - cyclohexyl - N - methylaminophenyl) - 3,4-dimethylmorpholine.*—Using the method detailed in Example 2 hereinabove, 11 parts of 2-(p-cyclohexylaminophenyl)-3-methylmorpholine, 10 parts of 90% formic acid, and 7 parts of 36% formaldehyde are caused to react by heating at the boiling point under reflux for 7 hours. Work-up yields a product, the infrared spectrum of which reveals a complete absence of the N—H absorption band at 2.9 microns. The product is 2-(p-N-cyclohexyl - N - methylaminophenyl) - 3,4 - dimethylmorpholine, of the formula

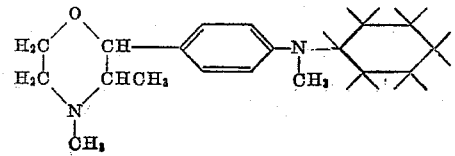

Example 5

A. 4 - benzoyl - 3 - methyl - 2 - (p - 2 - methylallyl-aminophenyl)morpholine.—A mixture of approximately 15 parts of 4-benzoyl-3-methyl-2-(p-aminophenyl)morpholine, 5 parts of 2-methylallyl chloride, 8 parts of potassium iodide, and 7 parts of potassium carbonate in 200 parts of butanone is processed substantially in accordance with the technique set forth in Example 3C above. After heating at the boiling point under reflux for approximately 4 hours, the mixture is worked up to give 4 - benzoyl - 3 - methyl - 2 - (p - 2 - methylallyl-aminophenyl)morpholine, which is taken to hydrolysis as detailed in part B of this example.

B. 3 - methyl - 2 - (p - 2 - methylallylaminophenyl)-morpholine.—A mixture of 7 parts of 4-benzoyl-3-methyl-2-(p-2-methylallylphenyl)morpholine, 40 parts of ethanol, and approximately 65 parts of aqeous 20% sulfuric acid is heated at the boiling point under reflux for 2½ hours, following which ethanol is removed by vacumm distillation and the residue extracted with ether. The aqueous phase is separated and made alkaline with dilute caustic soda. Extraction with ether and subsequent distillation of solvent serves to isolate 3-methyl-2-(p-2-methylallylaminophenyl)morpholine as the residue. The product has the formula

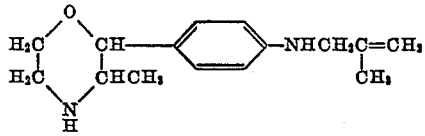

Example 6

A. 4 - benzoyl - 2 - (p - 2 - hydroxyethylamino-phenyl)-3-methylmorpholine.—Approximately 30 parts of 2 - (p - aminophenyl) - 4 - benzoyl - 3 - methyl-morpholine is dissolved in 250 parts of absolute ethanol, and to this solution is added 4 parts of ethylene oxide. The resultant mixture is maintained at 70° C. in a sealed kettle for 12 hours, then taken directly to hydrolysis as described in Part B of this example.

B. 2 - (p - 2 - hydroxyethylaminophenyl) - 3 - methyl-morpholine.—Following the 12-hour heating period prescribed in part A of this example, 260 parts of aqueous 20% muriatic acid is introduced and the resultant mixture heated at the boiling point under reflux for 3 hours. Work-up substantially in accordance with the procedure detailed in Example 3D hereinbefore yields pure 2-(p-2-hydroxyethylaminophenyl)-3-methylmorpholine, the formula of which is

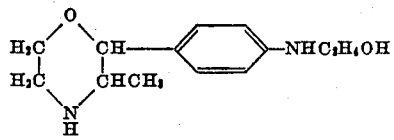

What is claimed is:
1. A compound of the formula

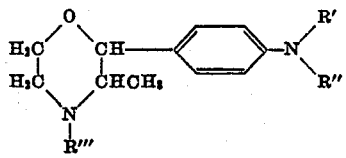

wherein R' and R'' are selected from the group conisting of hydrogen and lower alkyl, hydroxy(lower alkyl), lower alkenyl, and cyclohexyl radicals; and R''' is selected from the group consisting of hydrogen and lower alkyl radicals.

2. 2-(p-aminophenyl)-3-methylmorpholine.

3. 3,4 - dimethyl - 2 - (p - dimethylaminophenyl)morpholine.

4. 3 - methyl - 2 - (p - 2 - methylallylaminophenyl)-morpholine.

No references cited.